(12) United States Patent
Zhang et al.

(10) Patent No.: US 12,434,577 B2
(45) Date of Patent: Oct. 7, 2025

(54) ENERGY STORAGE SYSTEM AND CONTROL METHOD THEREOF

(71) Applicant: Sungrow Power Supply Co., Ltd., Hefei (CN)

(72) Inventors: Jie Zhang, Hefei (CN); Linchong Xu, Hefei (CN); Zijiao Pan, Hefei (CN); Peng Zhang, Hefei (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 760 days.

(21) Appl. No.: 17/685,210

(22) Filed: Mar. 2, 2022

(65) Prior Publication Data
US 2022/0297552 A1    Sep. 22, 2022

(30) Foreign Application Priority Data
Mar. 22, 2021    (CN) .......................... 202110306015.0

(51) Int. Cl.
*H02J 7/00* (2006.01)
*B60L 53/10* (2019.01)
(Continued)

(52) U.S. Cl.
CPC .............. *B60L 53/11* (2019.02); *B60L 53/51* (2019.02); *B60L 53/53* (2019.02); *B60L 53/57* (2019.02);
(Continued)

(58) Field of Classification Search
CPC .......... B60L 53/11; B60L 53/51; B60L 53/53; B60L 53/57; B60L 55/00; B60L 2210/10; H02J 3/322; H02J 7/34
(Continued)

(56) References Cited

U.S. PATENT DOCUMENTS

| | | | |
|---|---|---|---|
| 2010/0017045 A1* | 1/2010 | Nesler | B60L 53/665 700/295 |
| 2012/0181990 A1 | 7/2012 | Asakura et al. | |

(Continued)

FOREIGN PATENT DOCUMENTS

| | | |
|---|---|---|
| CN | 101710716 A | 5/2010 |
| CN | 107517001 A | 12/2017 |

(Continued)

OTHER PUBLICATIONS

Extended European Search Report for European Application No. 22159098.7, dated Aug. 9, 2022.

*Primary Examiner* — Zixuan Zhou
(74) *Attorney, Agent, or Firm* — Wolf, Greenfield & Sacks, P.C.

(57) ABSTRACT

An energy storage system and a control method thereof in the field of energy storage are provided. The system includes: an energy storage battery, a first bidirectional DC/DC circuit, a DC bus, a DC/AC circuit, a first controllable switch, and a second controllable switch. The energy storage battery is connected to a device side of the first bidirectional DC/DC circuit via the first controllable switch; a bus side of the first bidirectional DC/DC circuit is connected to the DC bus; the DC bus is connected to a public power grid via the DC/AC circuit; the second controllable switch has a first end connected to a chargeable vehicle, and a second end connected to the device side of the first bidirectional DC/DC circuit; and at most one of the first controllable switch and the second controllable switch is in a closed state at the same time.

7 Claims, 6 Drawing Sheets

(51) Int. Cl.
- *B60L 53/51* (2019.01)
- *B60L 53/53* (2019.01)
- *B60L 53/57* (2019.01)
- *B60L 55/00* (2019.01)
- *H02J 3/32* (2006.01)
- *H02J 7/34* (2006.01)

(52) U.S. Cl.
CPC .............. *B60L 55/00* (2019.02); *H02J 3/322* (2020.01); *H02J 7/34* (2013.01); *B60L 2210/10* (2013.01)

(58) Field of Classification Search
USPC .................................. 320/101, 109; 701/22
See application file for complete search history.

(56) References Cited

U.S. PATENT DOCUMENTS

2014/0300185 A1  10/2014  Buchstaller et al.
2020/0001730 A1*  1/2020  Gohla-Neudecker ........................ B60L 53/11

FOREIGN PATENT DOCUMENTS

DE    10 2019 102 030 A1    7/2020
JP           H09-84333 A    3/1997

* cited by examiner

ENERGY STORAGE SYSTEM AND CONTROL METHOD THEREOF

CROSS-REFERENCE TO RELATED APPLICATIONS

This application claims benefit of priority from Chinese application No. 202110306015.0, titled "ENERGY STORAGE SYSTEM AND CONTROL METHOD THEREOF", filed Mar. 22, 2021, with the China National Intellectual Property Administration, the disclosure of which is incorporated herein by reference in its entirety.

FIELD

The present disclosure relates to the technical field of energy storage, and particularly, to an energy storage system and a control method thereof.

BACKGROUND

Referring to FIG. 1, FIG. 1 illustrates an integrated system for photovoltaic storage and charging in conventional technology. The system includes a direct current (DC) charging pile, a DC bus, a photovoltaic panel, and an energy storage battery. The DC charging pile, a public power grid, the photovoltaic panel, and the energy storage battery are connected to the DC bus, and a charging control terminal is connected to the public power grid, the photovoltaic panel, the energy storage battery and the DC charging pile. The DC charging pile charges or obtains electric energy from a chargeable vehicle. The DC bus transmits electric energy to the DC charging pile or receives electric energy obtained by the DC charging pile. The public power grid and the energy storage battery transmit electric energy to or receive electric energy from the DC bus. The photovoltaic panel is used to transmit electric energy to the DC bus.

In a practical application, although the system can optimize energy allocation in an area and improve efficiency of electric energy by combining photovoltaic, energy storage and public power grid, the energy storage battery and the charging vehicle connect to the DC bus through respective bidirectional DC/DC circuits, resulting in higher overall system cost.

SUMMARY

An energy storage system and a control method thereof are provided in the present disclosure. An energy storage battery and a chargeable vehicle share a bidirectional DC/DC circuit, which helps to reduce overall cost of the energy storage system.

In order to achieve the above objectives, the following technical solutions are provided according to the present disclosure.

In a first aspect, an energy storage system is provided according to the present disclosure, including: an energy storage battery, a first bidirectional DC/DC circuit, a DC bus, a DC/alternating current (AC) circuit, a first controllable switch, and a second controllable switch.

The energy storage battery is connected to a device side of the first bidirectional DC/DC circuit via the first controllable switch;

a bus side of the first bidirectional DC/DC circuit is connected to the DC bus;

the DC bus is connected to a public power grid via the DC/AC circuit;

one end of the second controllable switch is configured to connect to a chargeable vehicle, and another end of the second controllable switch is connected to the device side of the first bidirectional DC/DC circuit; and at most one of the first controllable switch and the second controllable switch is in a closed state at the same time.

In an embodiment, the energy storage system according to the first aspect of the present disclosure further includes: a DC power supply, a third controllable switch and a DC/DC circuit.

The DC power supply is connected to a device side of the DC/DC circuit via the third controllable switch; and a bus side of the DC/DC circuit is connected to the DC bus.

In an embodiment, the DC/DC circuit includes a second bidirectional DC/DC circuit or a unidirectional DC/DC circuit.

In an embodiment, the energy storage system according to the first aspect of the present disclosure further includes a fourth controllable switch.

One end of the fourth controllable switch is connected to the energy storage battery, and another end of the fourth controllable switch is connected to the device side of the DC/DC circuit.

In an embodiment, the energy storage system according to the first aspect of the present disclosure further includes a fifth controllable switch.

One end of the fifth controllable switch is configured to connect to the chargeable vehicle, and another end of the fifth controllable switch is connected to the DC/DC circuit; and at most one of the fifth controllable switch and the fourth controllable switch is in a closed state at the same time.

In an embodiment, the energy storage system according to the first aspect of the present disclosure further includes a sixth controllable switch.

One end of the sixth controllable switch is connected to the DC power supply, and another end of the sixth controllable switch is connected to the device side of the first bidirectional DC/DC circuit.

In an embodiment, the DC power supply includes a photovoltaic power generation system.

In an embodiment, the first bidirectional DC/DC circuit includes at least one bidirectional DC/DC sub-circuit;

the DC/DC circuit includes at least one DC/DC sub-circuit; and the DC/AC circuit includes at least one DC/AC sub-circuit.

In an embodiment, the DC/AC circuit includes a bidirectional DC/AC circuit or a unidirectional DC/AC circuit.

In an embodiment, the energy storage system according to the first aspect of the present disclosure further includes a system controller for controlling charging and discharging processes of the energy storage system.

In an embodiment, each controllable switch in the energy storage system includes a contactor or a relay.

In a second aspect, a control method for an energy storage system is provided according to the present disclosure, which is applied to the energy storage system according to the first aspect of the present disclosure, the method including:

determining whether there is a charging request sent by a chargeable object; and controlling, in a case that the charging request exists, the energy storage system or a public power grid connected to the energy storage system to charge the chargeable object.

The chargeable object is at least one of an energy storage battery in the energy storage system or a chargeable vehicle connected to the energy storage system.

In an embodiment, the control method for an energy storage system according to the second aspect of the present disclosure further includes:

controlling, in a case that the charging request does not exist, the energy storage system to supply power to the public power grid.

In an embodiment, controlling the energy storage system or the public power grid connected to the energy storage system to charge the chargeable object includes:

obtaining operating states of candidate power supplies in the energy storage system and the public power grid connected to the energy storage system respectively, where the candidate power supplies include the energy storage battery, the chargeable vehicle, and a DC power supply in the energy storage system;

determining a target power supply by a preset priority order of power supply according to the operating states of the candidate power supplies and the public power grid;

determining a target power supply path between the target power supply and chargeable object according to a path selection rule; and controlling the target power supply path between the target power supply and the chargeable object to be turned on, for the target power supply to charge the chargeable object.

In an embodiment, determining the target power supply path between the target power supply and the chargeable object includes:

determining, in a case that there are multiple chargeable objects, a target chargeable object according to a preset order of charging priority; and determining a target power supply path between the target power supply and the target chargeable object.

In an embodiment, the preset priority order of power supply includes:

a priority of the DC power supply is higher than a priority of the public power grid;

the priority of the public power grid is higher than a priority of the energy storage battery; and the priority of the energy storage battery is higher than a priority of the chargeable vehicle, and the chargeable vehicle does not charge the energy storage battery.

In an embodiment, the preset order of charging priority includes:

in a case that the target power supply is the DC power supply, a priority of the chargeable vehicle is higher than a priority of the energy storage battery; and in a case that the target power supply is the public power grid, the priority of the energy storage battery is lower than or equal to the priority of the chargeable vehicle.

In an embodiment, controlling the energy storage system to supply power to the public power grid includes:

obtaining operating states of candidate power supplies in the energy storage system respectively, where the candidate power supplies include the energy storage battery, the chargeable vehicle, and a DC power supply in the energy storage system;

determining a target power supply by a preset priority order of power supply according to the operating states of the candidate power supplies;

determining a target power supply path between the target power supply and public power grid according to a path selection rule; and controlling the target power supply path between the target power supply and the public power grid to be turned on, for the target power supply to charge the public power grid.

In an embodiment, the path selection rule includes: the first bidirectional DC/DC circuit or the DC/DC circuit in the energy storage system is connected with at most one chargeable object at the same time.

The energy storage system according to the present disclosure includes the energy storage battery, the first bidirectional DC/DC circuit, the DC bus, the DC/AC circuit, the first controllable switch, and the second controllable switch. The energy storage battery is connected to the device side of the first bidirectional DC/DC circuit via the first controllable switch; the bus side of the first bidirectional DC/DC circuit is connected to the DC bus; the DC bus is connected to the public power grid via the DC/AC circuit; one end of the second controllable switch is configured to connect to the chargeable vehicle, and another end of the second controllable switch is connected to the device side of the first bidirectional DC/DC circuit so as to further connect, to the DC bus; and at most one of the first controllable switch and the second controllable switch is in the closed state at the same time. The energy storage system according to the present disclosure enables the energy storage battery to be connected to the DC bus via the first bidirectional DC/DC circuit when the first controllable switch is closed, and enables the chargeable vehicle to be connected to the DC bus via the first bidirectional DC/DC circuit when the second controllable switch is closed. The first controllable switch and the second controllable switch will not be closed at the same time, so that in normal operation of the energy storage system, the energy storage battery and the chargeable vehicle share one bidirectional DC/DC circuit. Compared with the conventional technology, the number of DC/DC circuits can be reduced, thereby reducing overall cost of the energy storage system.

BRIEF DESCRIPTION OF THE DRAWINGS

In order to more clearly explain the embodiments of the present disclosure or the technical solutions in the prior art, the drawings used in the description of the embodiments or the prior art will be briefly introduced below. Obviously, the drawings in the following description are merely some embodiments of the present disclosure. For those of ordinary skill in the art, other drawings can be obtained according to the provided drawings without paying creative labor.

DETAILED DESCRIPTION

The technical solution according to the embodiments of the present application will be described clearly and completely as follows in conjunction with the accompany drawings in the embodiments of the present application. It is obvious that the described embodiments are only a part of the embodiments according to the present application, rather than all of the embodiments. All the other embodiments obtained by those skilled in the art based on the embodiments in the present application without any creative work belong to the scope of protection of the present application.

Figure 2:
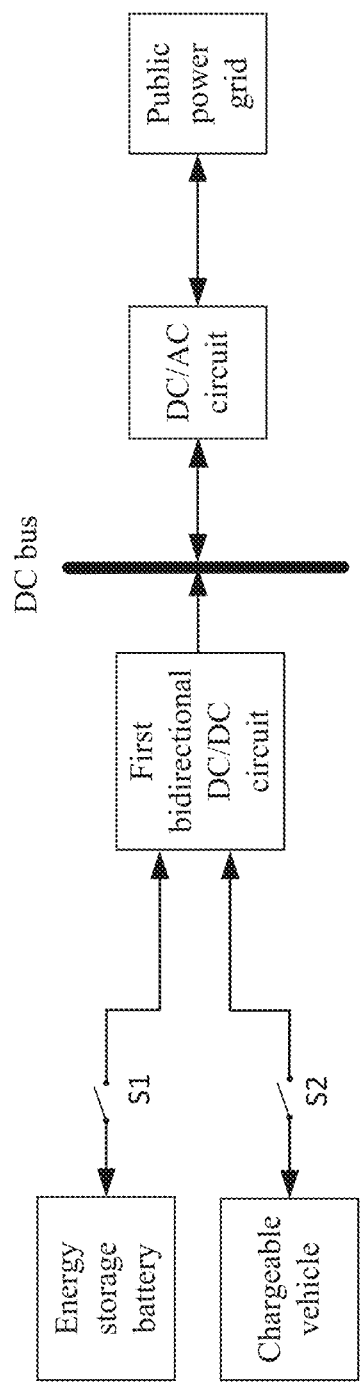
FIG. 2 is a structure diagram of an energy storage system according to an embodiment of the present disclosure.

Referring to FIG. 2, FIG. 2 is a structure diagram of an energy storage system according to an embodiment of the present disclosure. The energy storage system according to the embodiment of the present disclosure includes an energy storage battery, a first bidirectional DC/DC circuit, a DC bus, a DC/AC circuit, a first controllable switch S1, and a second controllable switch S2.

An out-connection terminal of the energy storage battery is connected to one end of the first controllable switch S1. Another end of the first controllable switch S1 is connected to a device side of the first bidirectional DC/DC circuit. That is, the energy storage battery is connected to the device side of the first bidirectional DC/DC circuit via the first controllable switch S1, and a bus side of the first bidirectional DC/DC circuit is connected to the DC bus. When the first controllable switch S1 is closed, the energy storage battery can be connected to the DC bus via the first bidirectional DC/DC circuit.

In an embodiment, the first bidirectional DC-DC circuit includes at least one bidirectional DC/DC sub-circuit. Each bidirectional DC/DC sub-circuit can independently perform conversion. In a case that the first bidirectional DC/DC circuit includes multiple bidirectional DC/DC sub-circuits, the bidirectional DC/DC sub-circuits are connected in parallel on both sides. That is, device sides of the bidirectional DC/DC sub-circuits are connected in parallel, and at the same time, bus sides of the bidirectional DC/DC sub-circuits are connected in parallel.

Further, one end of the second controllable switch S2 is configured to connect to a chargeable vehicle, and another end of the second controllable switch S2 is connected to the device side of the first bidirectional DC/DC circuit. When the second controllable switch S2 is closed, the chargeable vehicle can be connected to the DC bus via the first bidirectional DC/DC circuit. It is conceivable that in a practical application, the second controllable switch S2 may be a controllable switch connected in series with a charging interface of a DC charging pile. When the charging interface is connected to the chargeable vehicle, the connection between the chargeable vehicle and the second controllable switch S2 is established.

The DC bus is connected to a public power grid via the DC/AC circuit. In an embodiment, in a practical application, the DC/AC circuit may be a bidirectional DC/AC circuit or a unidirectional DC/AC circuit. Based on basic operating principles of the bidirectional DC/AC circuit and the unidirectional DC/AC circuit, it can be known that if the bidirectional DC/AC circuit is selected, the public power grid can supply power to the DC bus through the bidirectional DC/AC circuit, and further supply power to the energy storage battery and the chargeable vehicle. At the same time, the energy storage battery and the chargeable vehicle also provide electric energy to the public power grid via the bidirectional DC/AC circuit to make up for the shortage of the public power grid. If the unidirectional DC/AC circuit is selected, the public power grid can only supply power to the DC bus, but cannot receive electric energy from the energy storage battery or the chargeable vehicle. In a practical application, a specific form of the DC/AC circuit may be selected in accordance with a specific application requirement.

Similar to the optional configuration of the first bidirectional DC/DC circuit, the DC/AC circuit includes at least one DC/AC sub-circuit. In practice, a function and a specific configuration of each DC/AC sub-circuit is completely the same, and when the DC/AC circuit includes multiple DC/AC sub-circuits, the DC/AC sub-circuits are connected in parallel on both sides.

According to basic characteristics of an energy storage battery and a power battery in a chargeable vehicle, charge and discharge curves of the energy storage battery and the power battery are different in most cases. The energy storage battery and the power battery of the chargeable vehicle cannot be charged at the same time, or discharge to the DC bus at the same time. Therefore, at most one of the first controllable switch S1 and the second controllable switch S2 is in the closed state at the same time.

From the above, the energy storage system according to the embodiment of the present disclosure enables the energy storage battery to be connected to the DC bus via the first bidirectional DC/DC circuit when the first controllable switch is closed, and enables the chargeable vehicle to be connected to the DC bus through the first bidirectional DC/DC circuit when the second controllable switch is closed. The first controllable switch and the second controllable switch will not be closed at the same time, so that the energy storage battery and the chargeable vehicle share one bidirectional DC/DC circuit while ensuring normal operation of the energy storage system. Compared with the conventional technology, the number of DC/DC circuits can be reduced, thereby reducing overall cost of the energy storage system.

Figure 3:
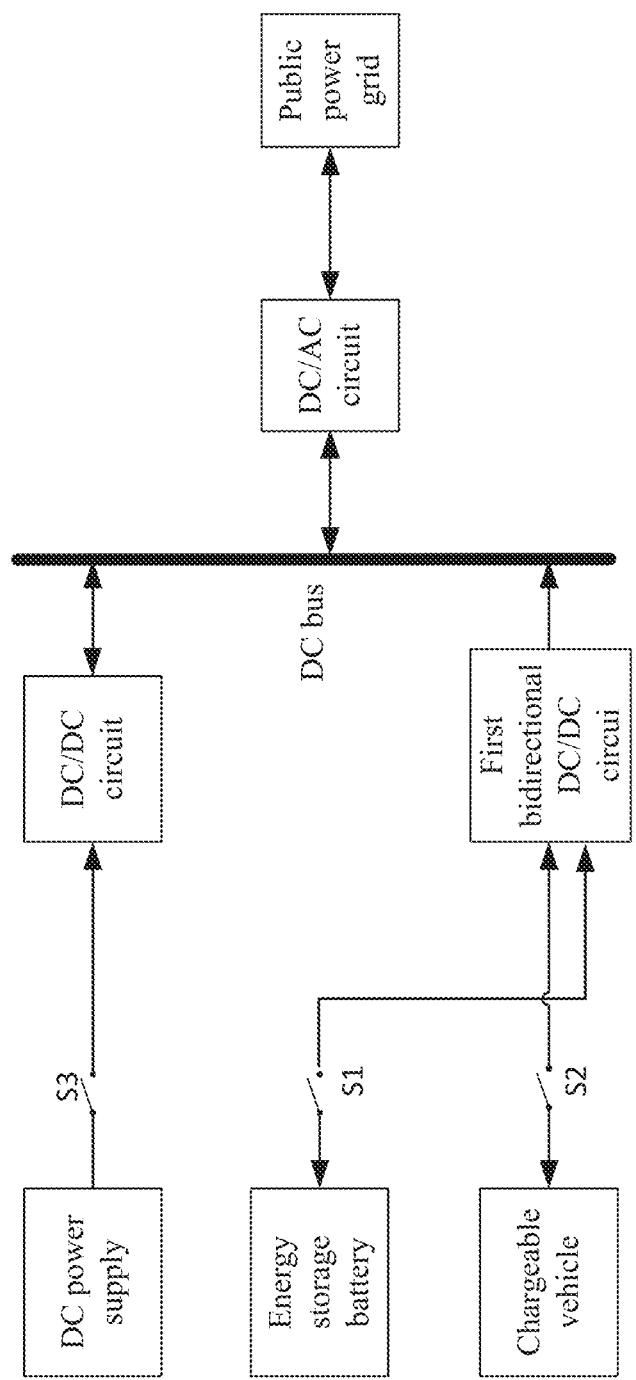
FIG. 3 is a structure diagram of another energy storage system according to an embodiment of the present disclosure.

In an embodiment, referring to FIG. 3, FIG. 3 is a structure diagram of another energy storage system according to an embodiment of the present disclosure. On the basis of the embodiment illustrated in FIG. 2, the energy storage system further includes: a DC power supply, a third controllable switch S3 and a DC/DC circuit.

An output end of the DC power supply is connected to one end of the third controllable switch S3, and another end of the third controllable switch S3 is connected to a device side of the DC/DC circuit, that is, the output end of the DC power supply is connected to the device side of the DC/DC circuit through the third controllable switch S3, and a bus side of the DC/DC circuit is connected to the DC bus. When the third controllable switch S3 is closed, the DC power supply can be connected to the DC bus through the DC/DC circuit.

In an embodiment, in a practical application, the DC power source may be a photovoltaic power generation system, or alternatively, a hydrogen fuel cell power generation system.

In this embodiment, the DC power supply is connected to the DC bus, as a power supply, and there is only one current flow direction, that is, from the DC power supply to the DC bus. Therefore, in order to reduce cost of the entire system, the DC/DC circuit may be a unidirectional DC/DC Circuit.

In the energy storage system according to the embodiment of the present disclosure, both the DC power supply and the public power grid can be used as the power supply. In a practical application, an operating state of the entire energy storage system can be changed by controlling opening and closing of the controllable switches.

For example, when the energy storage system is connected to the chargeable vehicle, the second controllable switch S2 and the third controllable switch S3 are closed, and the first controllable switch S1 is kept open; in this case, the DC power supply and the public power grid can provide charging power to the chargeable vehicle at the same time.

In another example, when the energy storage battery needs to be charged, the first controllable switch S1 and the third controllable switch S3 can be closed to establish the connection between the DC power supply and the public power grid and the energy storage battery, so that the DC power supply and the public power grid can charge the energy storage battery together.

Figure 1:
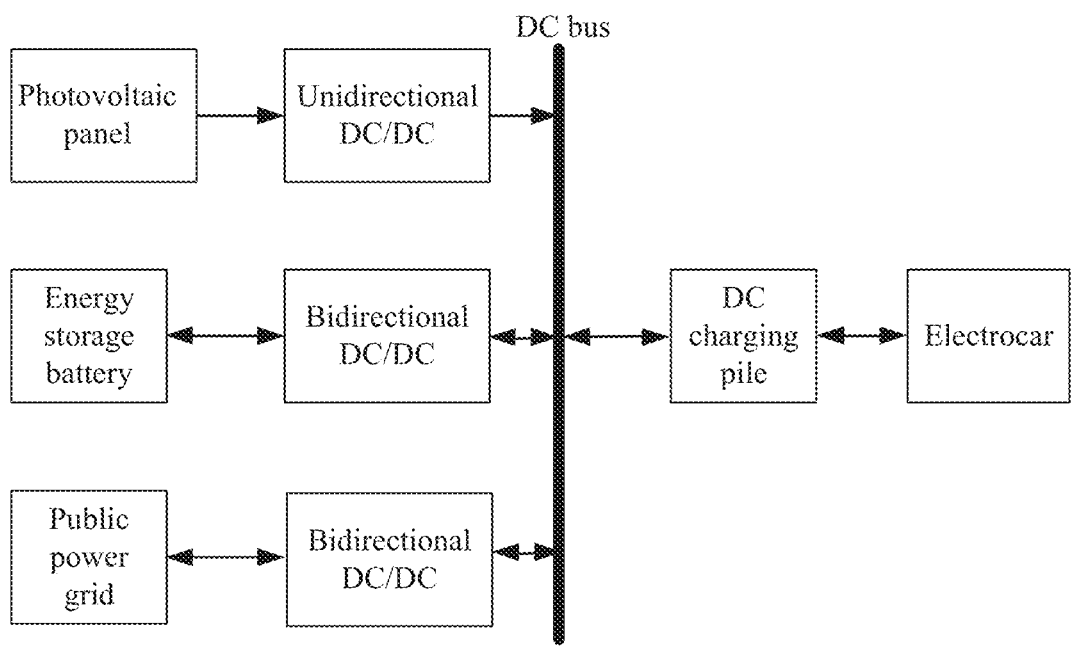
FIG. 1 is a structure diagram of an integrated system for photovoltaic storage and charging in conventional technology.

In summary, the energy storage system according to the embodiment of the present disclosure can not only realize an integrated design of photovoltaic storage and charging, but also the energy storage battery and the chargeable vehicle can share the first bidirectional DC/DC circuit by controlling the controllable switches in a coordinated manner. Compared with the conventional technology as illustrated in FIG. 1, the number of DC/DC circuits can be reduced, and the overall cost of the energy storage system is lowered.

Figure 4:
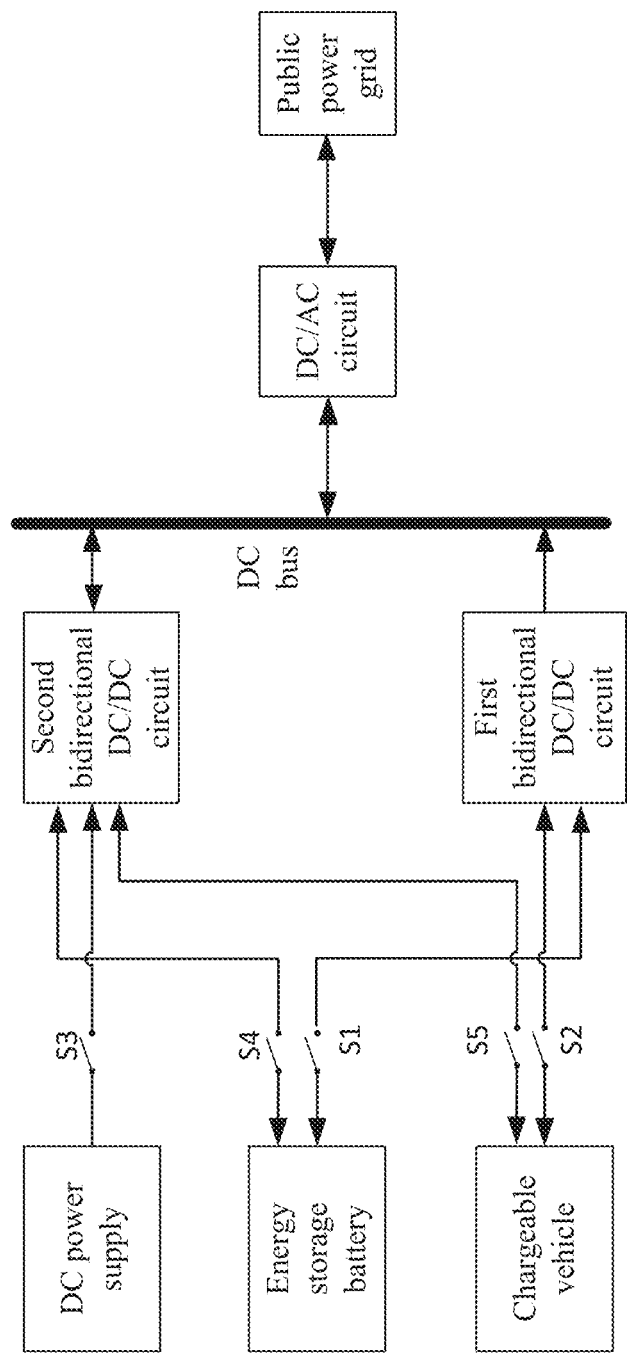
FIG. 4 is a structure diagram of another energy storage system according to an embodiment of the present disclosure.

In an embodiment, referring to FIG. 4, FIG. 4 is a structure diagram of another energy storage system according to an embodiment of the present disclosure. On the basis of the embodiment illustrated in FIG. 3, the energy storage system according to the embodiment further includes a fourth controllable switch S4 and a fifth controllable switch S5.

As illustrated in FIG. 4, one end of the fourth controllable switch is connected to the energy storage battery, and another end of the fourth controllable switch is connected to the device side of the DC/DC circuit. It should be noted that in this embodiment, the DC/DC circuit is a bidirectional DC/DC circuit. In order to distinguish from the first bidirectional DC/DC circuit in the foregoing embodiment, in this embodiment, the bidirectional DC/DC circuit is illustrated as a second bidirectional DC/DC circuit. A specific effect of selecting the bidirectional DC/DC circuit will be expanded in follow-up content and will not be detailed here.

One end of the fifth controllable switch S5 is configured to connect to the chargeable vehicle, and another end of the fifth controllable switch is connected to the second bidirectional DC/DC circuit. In a practical application, when the energy storage system is connected to the chargeable vehicle, the chargeable vehicle can be connected to the DC bus through the second bidirectional DC/DC circuit.

As mentioned above, the charging and discharging curves of the power battery in the chargeable vehicle and the energy storage battery are different, and the power battery and the energy storage battery cannot be connected to the DC bus at the same time. Therefore, at most one of the fifth controllable switch S5 and the fourth controllable switch S4 is in a closed state at the same time.

The following describes a typical application mode of the energy storage system provided in this embodiment.

When the energy storage system is connected to the chargeable vehicle, the second controllable switch S2 and the fifth controllable switch S5 are controlled to be closed at the same time, and the other controllable switches are in an open state. The chargeable vehicle can be connected to the DC bus through the first bidirectional DC/DC circuit, and at the same time to the DC bus through the second bidirectional DC/DC circuit. If allowed by the capacity of the DC/AC circuit, the public power grid can charge the chargeable vehicle through the first bidirectional DC/DC circuit and the second bidirectional DC/DC circuit, thereby increasing the maximum output capacity of the charging pile.

Correspondingly, if the first controllable switch S1 and the fourth controllable switch S4 are closed at the same time, the energy storage battery can be connected to the DC bus through the first bidirectional DC/DC circuit and the second bidirectional DC/DC circuit, and then perform charge and discharge operations.

In another example, by controlling the third controllable switch S3 and the second controllable switch S2 to close, the DC power supply and the public power grid can supply power to the chargeable vehicle at the same time.

In summary, in the energy storage system according to the embodiment of the present disclosure, the DC power supply, the energy storage battery, and the chargeable vehicle share two DC/DC circuits, which can significantly reduce the cost of the energy storage system compared with the conventional technology. At the same time, if allowed by the capacity of the DC/AC circuit, the first bidirectional DC/DC circuit and the second bidirectional DC/DC circuit can be used to charge the energy storage battery or chargeable vehicle at the same time, which can expand the maximum output capacity of the charging pile.

It should be noted that, regardless of whether the DC/DC circuit is a bidirectional DC/DC circuit or a unidirectional DC/DC circuit, the DC/DC circuit can include at least one DC/DC sub-circuit, and in a case that the DC/DC circuit includes multiple DC/DC sub-circuits, the DC/DC sub-circuits are connected in parallel on both sides.

Figure 5:
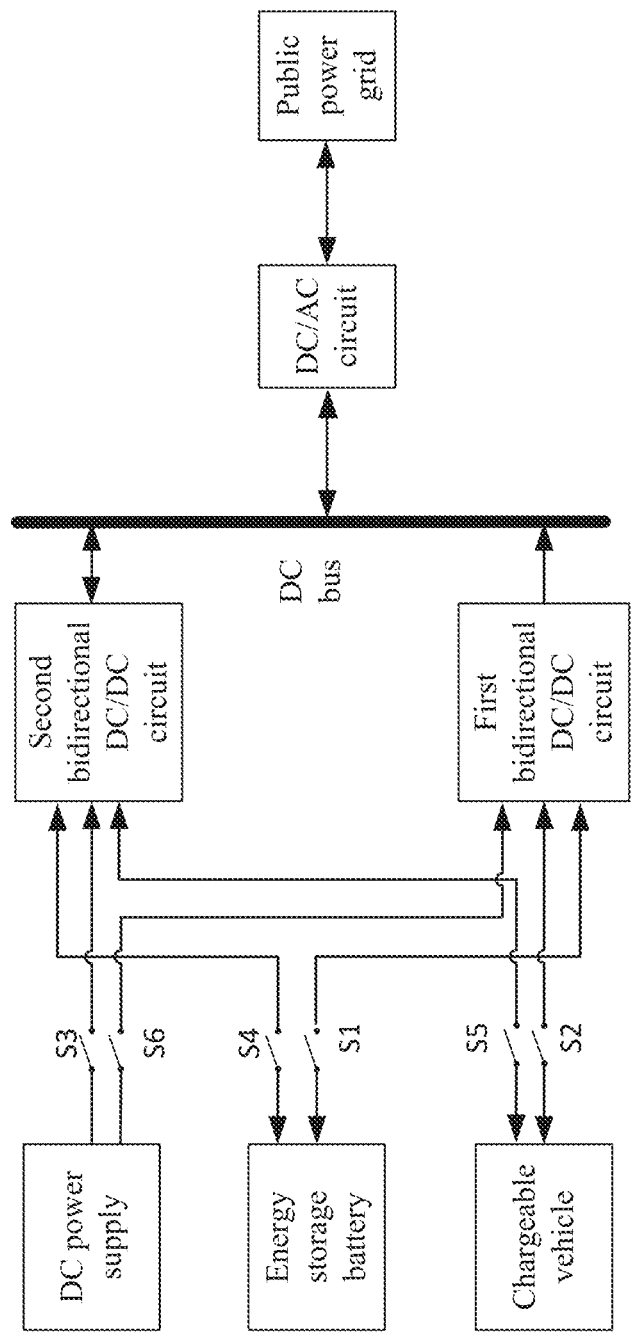
FIG. 5 is a structure diagram of another energy storage system according to an embodiment of the present disclosure.

In an embodiment, referring to FIG. 5, FIG. 5 is a structure diagram of another energy storage system according to an embodiment of the present disclosure. On the basis of the embodiment illustrated in FIG. 4, the system further includes a sixth controllable switch S6.

One end of the sixth controllable switch S6 is connected to the DC power supply, and another end of the sixth controllable switch S6 is connected to the device side of the first bidirectional DC/DC circuit.

By setting the sixth controllable switch S6, more charging and discharging paths can be established, making a working process of the energy storage system more flexible. Various working modes of the energy storage system illustrated in FIG. 5 will be introduced in the following, and will not be described in detail here.

In an embodiment, on the basis of the energy storage system according to any of the above embodiments, the energy storage system may further include a system controller, which is connected to each component of the energy storage system, and controls an operating state of each component. For example, the system controller is connected to a control end of the controllable switch, and to the energy storage battery and the DC power supply, so as to realize control of the charging and discharging processes of the energy storage system.

In an embodiment, in the energy storage system according to any of the above embodiments, each controllable switch can be implemented by using a contactor or a relay. In practice, any other implementations that can achieve the above-mentioned the functionality of the controllable switches also fall within the protection scope of the present disclosure.

Figure 6:
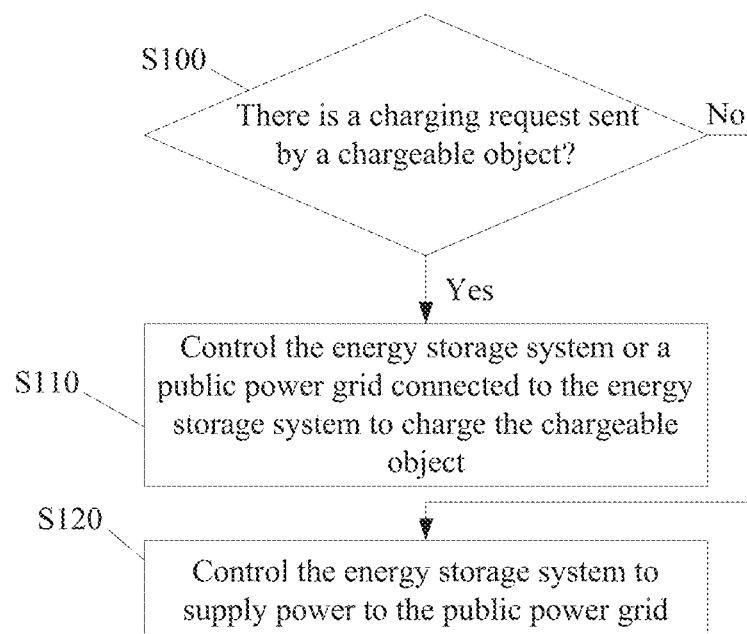
FIG. 6 is a flowchart of a control method for an energy storage system according to an embodiment of the present disclosure.

Referring to FIG. 6, FIG. 6 is a flowchart of a control method for an energy storage system according to an embodiment of the present disclosure. The control method according to the embodiment of the present disclosure can be applied to the energy storage system according to any of the above embodiments. Specifically, the control method can be applied to the system controller of the energy storage system. In practice, the control method can also be applied to a controller independent of the energy storage system but capable of controlling the charging and discharging processes of the energy storage system, or the control method may even be applied to a server on network side.

A process flow of the control method for an energy storage system in this embodiment may include steps S100 to S120.

In step S100, whether there is a charging request sent by a chargeable object is determined.

Based on the energy storage system according to the foregoing various embodiments, the chargeable object in the energy storage system mainly includes two, namely, a chargeable vehicle connected to the energy storage system and an energy storage battery in the energy storage system. A process of obtaining and identifying the charging request sent by the chargeable object can be implemented with reference to the conventional technology, which is not limited in the present disclosure.

In step S110, in a case that the charging request exists, the energy storage system or a public power grid connected to the energy storage system is controlled to charge the chargeable object.

In a practical application, the timing when the energy storage battery and the chargeable vehicle send the charging request is uncertain. It is possible to receive charging requests from the energy storage battery and the chargeable vehicle at the same time, or to receive a charging request initiated by either of them. In practice, there may be no charge request. When there is a charging request, the energy storage system or the public power grid can be controlled to charge the chargeable object. Whether to charge the chargeable object by the energy storage system or by the public power grid needs to be determined according to a specific situation of the energy storage system.

In an embodiment, in a case of determining that there is a charging request, operating states of candidate power supplies in the energy storage system and the public power grid connected to the energy storage system are obtained first. With reference to a structure of the energy storage system, it can be known that the candidate power supplies may include the energy storage battery, the chargeable vehicle and a DC power supply in the energy storage system. In most cases, the DC power supply is implemented based on a photovoltaic power generation system.

Then, according to the operating states of the candidate power supplies and the public power grid, a target power supply is determined according to a preset priority order of power supply. Specifically, the preset priority order of power supply in this embodiment may be: a priority of the DC power supply is higher than a priority of the public power grid, the priority of the public power grid is higher than a priority of the energy storage battery, the priority of the energy storage battery is higher than a priority of the chargeable vehicle, and the chargeable vehicle does not charge the energy storage battery.

For example, when the public power grid and the DC power supply are both operating normally, and an output power of the DC power supply is sufficient, it is preferable to use the DC power supply to charge a local chargeable object; when the DC power supply cannot supply power, it is preferable to use the public power grid rather than the energy storage battery to charge the chargeable vehicle.

Further, as mentioned above, it is possible fix the energy storage battery and the chargeable vehicle to initiate charging requests at the same time. Therefore, it is also necessary to limit selection of the chargeable object. To this end, the embodiment of the present disclosure provides a preset order of charging priority, which includes: in a case the target power supply is the DC power supply, a priority of the chargeable vehicle is higher than a priority of the energy storage battery, that is, the charging of the chargeable vehicle is prioritized; in a case that the target power supply is the public power grid, the priority of the energy storage battery is lower than or equal to the priority of the chargeable vehicle. That is, when the public power grid is the target power supply, if both the chargeable vehicle and the energy storage battery initiate charging requests at the same time, the energy storage battery and the chargeable vehicle can be powered at the same time, or only the chargeable vehicle is powered. The specific selection can be set in accordance with an actual situation of a charging station.

After the target power supply and the target chargeable object are determined, a target power supply path between the target power supply and the chargeable object can be determined according to a path selection rule. In an embodiment, the path selection rule in the embodiment of the present disclosure may be: the first bidirectional DC/DC circuit or the DC/DC circuit in the energy storage system in any of the above embodiments (i.e., the unidirectional DC/DC circuit or the second bidirectional DC/DC circuit) is connected to at most one chargeable object at the same time to prevent the energy storage battery and the chargeable vehicle from being connected to the same DC/DC circuit at the same time.

After the target power supply path is determined, the target power supply path between the target power supply and the chargeable object can be controlled to be turned on, so that the target power supply can charge the chargeable object.

In step S120, if the charging request does not exist, the energy storage system is controlled to supply power to the public power grid.

A process of the energy storage system supplying power to the public power grid is similar to the above-mentioned control process for charging the chargeable object. First, operating states of candidate power supplies in the energy storage system are obtained respectively. The candidate power supplies include the energy storage battery, the chargeable vehicle, and the DC power supply in the energy storage system; a target power supply is determined by a preset priority order of power supply according to the operating states of the candidate power supplies; a target power supply path between the target power supply and the public power grid is determined according to the path selection rule; a target power supply path between the target power supply and the public power grid is controlled to be turned on, so that the target power supply charges the public grid.

It should be noted that the preset priority of power supply and the preset path selection rule involved in this step can be implemented with reference to the foregoing embodiments, and the detailed description will not be repeated here.

Taking the energy storage system illustrated in FIG. 5 as an example, the control process that may occur in the energy storage system in a practical application, especially the selection of the target chargeable object and the target power supply path, will be described. In addition, in the energy storage system in the embodiment illustrated in FIG. 5, the DC power supply is implemented by a photovoltaic power generation system, and the DC/AC circuit is a bidirectional DC/AC circuit. For details, please refer to the following table:

| Serial NO. | State of public power grid | State of component in photovoltaic power generation system | State of chargeable vehicle and energy storage battery | Charging requests of chargeable vehicle and energy storage battery | Optional power supply path | State of controllable switch (target power supply path) |
|---|---|---|---|---|---|---|
| 1 | Public grid is normal | Photovoltaic power generation system generates electricity normally | Both the chargeable vehicle and energy storage battery exist | Both have charging request | Only respond to a request of a charging pile. When the output energy of the photovoltaic power generation system is greater than the capacity of the charging pile, the photovoltaic power generation system outputs energy to the public power grid and the charging pile, otherwise the photovoltaic power generation system and the public power grid output energy to the charging pile. | Close S3 and S2, or S6 and S5. |
| 2 | | | | Only the charging request of the chargeable vehicle | When the output energy of the photovoltaic power generation system is greater than the capacity of the charging pile, the photovoltaic power generation system outputs energy to the public power grid and the charging pile, otherwise the photovoltaic power generation system and the public power grid output energy to the charging pile. | Close S3 and S2, or S6 and S5. |
| 3 | | | | Only the charging request of the energy storage battery | When the output energy of the photovoltaic power generation system is greater than the capacity of the energy storage battery, the photovoltaic power generation system outputs energy to the public power grid and the energy storage battery, otherwise the photovoltaic power generation system and the public power grid output energy to the energy storage battery. | Close S3 and S1, or S6 and S4. |
| 4 | | | | No charging request | Photovoltaic power generation system outputs energy to the public power grid. | Close S3 or S6. |
| 5 | | | Only the energy storage | Charging request exists | When the output energy of the photovoltaic power | Close S3 and S1, or S6 and S4. |

-continued

| Serial NO. | State of public power grid | State of component in photovoltaic power generation system | State of chargeable vehicle and energy storage battery | Charging requests of chargeable vehicle and energy storage battery | Optional power supply path | State of controllable switch (target power supply path) |
|---|---|---|---|---|---|---|
| | | | battery exists | | generation system is greater than the capacity of the energy storage battery, the photovoltaic power generation system outputs energy to the public power grid and the energy storage battery, otherwise the photovoltaic power generation system and the public power grid output energy to the energy storage battery. | |
| 6 | | | | No charging request | Photovoltaic power generation system outputs energy to the public power grid. | Close S3 or S6. |
| 7 | | | Only the chargeable vehicle exists | Charging request exists | When the output energy of the photovoltaic power generation system is greater than the capacity of the charging pile, the photovoltaic power generation system outputs energy to the public power grid and the charging pile, otherwise the photovoltaic power generation system and the public power grid output energy to the charging pile. | Close S3 and S2, or S6 and S5. |
| 8 | | | | No charging request | Photovoltaic power generation system outputs energy to the public power grid | Close S3 or S6. |
| 9 | | | Neither of them exists | \ | Photovoltaic power generation system outputs energy to the public power grid. | Close S3 or S6. |
| 10 | | Photovoltaic power generation system does not generates electricity | Both the chargeable vehicle and energy storage battery exist | Both have charging request | The public power grid charges the energy storage battery and the chargeable vehicle through two DC/DC circuits respectively, or charges the chargeable vehicle through two DC/DC circuits | Close S4 and S2, or S1 and S5, or S3 and S2. |
| 11 | | | | Only charging request of the chargeable vehicle | The public power grid charges the chargeable vehicle through one or two DC/DC circuits | Close S3, or S2, or S5 and S2. |

-continued

| Serial NO. | State of public power grid | State of component in photovoltaic power generation system | State of chargeable vehicle and energy storage battery | Charging requests of chargeable vehicle and energy storage battery | Optional power supply path | State of controllable switch (target power supply path) |
|---|---|---|---|---|---|---|
| 12 | | | | Only the charging request of the energy storage battery | The public power grid charges the energy storage battery through one or two DC/DC circuits | Close S4, or S1, or S4 and S1. |
| 13 | | | | No charging request | When the public power grid is weak, the battery discharges to support the public power grid, the energy storage battery is discharged preferably, and the system does not work when the public power grid is normal. | Close S4, or S1, or S4 and S1. |
| 14 | | | Only the energy storage battery exists | Charging request exists | The public power grid charges the energy storage battery through one or two DC/DC circuits | Close S4, or S1, or S4 and S1. |
| 15 | | | | No charging request | When the public power grid is weak, the battery discharges to support the public power grid, and the system does not work when the public power grid is normal. | Close S4, or S1, or S4 and S1. |
| 16 | | | Only the chargeable vehicle exists | Charging request exists | The public power grid charges the chargeable vehicle through one or two DC/DC circuits | Close S5, or S2, or S5 and S2. |
| 17 | | | | No charging request | When the public power grid is weak, the battery discharges to support the public powder grid, and the system does not work when the public power grid is normal. | Close S5, or S2, or S5 and S2. |
| 18 | | | Neither of them exists | \ | The system does not work. | \ |
| 19 | Public power grid failure | photovoltaic power generation system generates electricity normally | Both the chargeable vehicle and energy storage battery exist | Both have charging request | The energy of the photovoltaic power generation system preferentially charges the chargeable vehicle through the DC bus. | Close S3, or S2, or S6 and S5. |
| 20 | | | | Only charging request of the chargeable vehicle | The energy of the photovoltaic power generation system charges the chargeable vehicle through the DC bus. | Close S3, or S2, or S6 and S5. |
| 21 | | | | Only the charging request of the | The energy of the photovoltaic power | Close S3, or S1, or S6 |

| Serial NO. | State of public power grid | State of component in photovoltaic power generation system | State of chargeable vehicle and energy storage battery | Charging requests of chargeable vehicle and energy storage battery | Optional power supply path | State of controllable switch (target power supply path) |
|---|---|---|---|---|---|---|
| | | | energy storage battery | | generation system charges the energy storage battery through the DC bus. | and S4. |
| 22 | | | | No charging request | The system does not work. | \ |
| 23 | | | Only the energy storage battery exists | Charging request exists | The energy of the photovoltaic power generation system charges the energy storage battery through the DC bus. | Close S3, or S1, or S6 and S4. |
| 24 | | | | No charging request | The system does not work. | \ |
| 25 | | | Only the chargeable vehicle exists | Charging request exists | The energy of the photovoltaic power generation system charges the chargeable vehicle through the DC bus. | Close S3, or S2, or S6 and S5. |
| 26 | | | | No charging request | The system does not work. | \ |
| 27 | | | Neither of them exists | \ | The system does not work. | \ |
| 28 | | photovoltaic power generation system does not generate electricity | Both the chargeable vehicle and energy storage battery exist | Both have charging request | The energy storage battery charges the chargeable vehicle through the DC bus. | Close S4, or S2, or S1 and S5. |
| 29 | | | | Only charging request of the chargeable vehicle | The energy storage battery charges the chargeable vehicle through the DC bus. | Close S4, or S2, or S1 and S3. |
| 30 | | | | Only charging request of the energy storage battery | The system does not work. | \ |
| 31 | | | | No charging request | The system does not work. | \ |
| 32 | | | Only the energy storage battery exists | Charging request exists | The system does not work. | \ |
| 33 | | | | No charging request | The system does not work. | \ |
| 34 | | | Only the chargeable vehicle exists | Charging request exists | The system does not work. | \ |
| 35 | | | | No charging request | The system does not work. | \ |
| 36 | | | Neither of them exists | \ | The system does not work. | \ |

On the basis of the above table, reference may be made to the following.

1. There are 7 power supply paths starting from the photovoltaic power generation system:

(1) the photovoltaic power generation system→the first bidirectional DC/DC circuit→the bidirectional DC/AC→the public power grid;

(2) the photovoltaic power generation system→the first bidirectional DC/DC circuit→the second bidirectional DC/DC circuit→the chargeable vehicle;

(3) the photovoltaic power generation system→the first bidirectional DC/DC circuit→the second bidirectional DC/DC circuit→the energy storage battery;

(4) the photovoltaic power generation system→the second bidirectional DC/DC circuit→the bidirectional DC/AC→the public power grid;

(5) the photovoltaic power generation system→the second bidirectional DC/DC circuit→the first bidirectional DC/DC circuit→the chargeable vehicle;

(6) the photovoltaic power generation system→the second bidirectional DC/DC circuit→the first bidirectional DC/DC circuit→the energy storage battery;

(7) the photovoltaic power generation system→the first bidirectional DC/DC circuit and the second bidirectional DC/DC circuit in parallel→the bidirectional DC/AC→the public power grid.

The energy storage battery and the chargeable vehicle generally cannot be charged through the first bidirectional DC/DC circuit or the second DC/DC circuit at the same time, for their charging curves may be different.

2. There are 6 power supply paths starting from the public power grid:
 (1) the public power grid→the bidirectional DC/AC→the first bidirectional DC/DC circuit→the energy storage battery;
 (2) the public power grid→the bidirectional DC/AC→the first bidirectional DC/DC circuit→the chargeable vehicle;
 (3) the public power grid→the bidirectional DC/AC→the second bidirectional DC/DC circuit→the energy storage battery;
 (4) the public power grid→the bidirectional DC/AC→the second bidirectional DC/DC circuit→the chargeable vehicle;
 (5) the public power grid→the bidirectional DC/AC→the first bidirectional DC/DC circuit and the second bidirectional DC/DC circuit in parallel→the energy storage battery;
 (6) the public power grid→the bidirectional DC/AC→the first bidirectional DC/DC circuit and the second bidirectional DC/DC circuit in parallel→the chargeable vehicle.

The energy storage battery and the chargeable vehicle cannot be charged through the first bidirectional DC/DC circuit or the second DC/DC circuit at the same time, and but can be simultaneously charged respectively through the first bidirectional DC/DC circuit and the second bidirectional DC/DC circuit.

3. There are 5 power supply paths starting from the energy storage battery:
 (1) the energy storage battery→the first bidirectional DC/DC circuit→the bidirectional DC/AC→the public power grid;
 (2) the energy storage battery→the second bidirectional DC/DC circuit→the bidirectional DC/AC→the public power grid;
 (3) the energy storage battery→the first bidirectional DC/DC circuit and DC/DC2 in parallel→the bidirectional DC/AC→the public power grid;
 (4) the energy storage battery→the first bidirectional DC/DC circuit→the second bidirectional DC/DC circuit→the chargeable vehicle;
 (5) the energy storage battery→the second bidirectional DC/DC circuit→the first bidirectional DC/DC circuit→the chargeable vehicle.

4. There are 5 power supply paths starting from the chargeable vehicle:
 (1) the chargeable vehicle→the first bidirectional DC/DC circuit→the bidirectional DC/AC→the public power grid;
 (2) the chargeable vehicle→the second bidirectional DC/DC circuit→the bidirectional DC/AC→the public power grid;
 (3) the chargeable vehicle→the first bidirectional DC/DC circuit and the second bidirectional DC/DC circuit in parallel→the bidirectional DC/AC→the public power grid;
 (4) the chargeable vehicle→the second bidirectional DC/DC circuit→the first bidirectional DC/DC circuit→the energy storage battery;
 (5) the chargeable vehicle→the first bidirectional DC/DC circuit→the second bidirectional DC/DC circuit→the energy storage battery.

5. The photovoltaic power generation system, energy storage battery and chargeable vehicle battery may be combined in the following three manners to charge the public power grid:
 (1) the photovoltaic power generation system and the energy storage battery charge the public power grid at the same time.
 (2) the photovoltaic power generation system and the chargeable vehicle battery charge the public power grid at the same time.
 (3) the chargeable vehicle battery and the energy storage battery charge the public power grid at the same time.

6. The photovoltaic power generation system, energy storage battery and public power grid may be combined in four manners to charge the chargeable vehicle battery.

Specific operating conditions are analogous to the above section 5.

7. The photovoltaic power generation system, chargeable vehicle battery and public power grid may be combined in four manners to charge the energy storage battery.

Specific operating conditions are analogous to the above section 5.

The above embodiments in this specification are described in a progressive manner. Each of the embodiments is mainly focused on describing its differences from other embodiments, and references may be made among these embodiments with respect to the same or similar portions among these embodiments.

Since device embodiments are similar to method embodiments, the description thereof is relatively simple, and reference may be made to the description of the method embodiments for relevant parts.

The embodiments described hereinabove are only preferred embodiments of the present application, and are not intended to limit the scope of the present application in any form. Although the present application is disclosed by the above preferred embodiments, the preferred embodiments should not be interpreted as a limitation to the present application. For those skilled in the art, many variations, modifications or equivalent replacements may be made to the technical solutions of the present application by using the methods and technical contents disclosed hereinabove, without departing from the scope of the technical solutions of the present application. Therefore, any simple modifications, equivalent replacements and modifications, made to the above embodiments based on the technical essences of the present application without departing from the technical solutions of the present application, are deemed to fall into the scope of the technical solution of the present application.

The invention claimed is:

1. A control method for an energy storage system, applied to an energy storage system, wherein the energy storage system comprises: an energy storage battery, a first bidirectional DC/DC circuit, a DC bus, a DC/AC circuit, a first controllable switch, and a second controllable switch; the energy storage battery is connected to a device side of the first bidirectional DC/DC circuit via the first controllable switch; a bus side of the first bidirectional DC/DC circuit is connected to the DC bus; the DC bus is connected to a public power grid via the DC/AC circuit; one end of the second controllable switch is configured to connect to a chargeable vehicle, and another end of the second controllable switch is connected to the device side of the first bidirectional DC/DC circuit; and at most one of the first controllable switch and the second controllable switch is in a closed state at the same time;

wherein the method comprises:
determining whether there is a charging request sent by a chargeable object; and
controlling, in a case that the charging request exists, the energy storage system or a public power grid connected to the energy storage system to charge the chargeable object;
wherein the chargeable object is at least one of an energy storage battery in the energy storage system or a chargeable vehicle connected to the energy storage system;
wherein controlling the energy storage system or the public power grid connected to the energy storage system to charge the chargeable object comprises:
obtaining operating states of candidate power supplies in the energy storage system and the public power grid connected to the energy storage system respectively, wherein, the candidate power supplies comprise the energy storage battery, the chargeable vehicle, and a DC power supply in the energy storage system;
determining a target power supply by a preset priority order of power supply according to the operating states of the candidate power supplies and the public power grid;
determining a target power supply path between the target power supply and the chargeable object according to a path selection rule; and
controlling the target power supply path between the target power supply and the chargeable object to be turned on, for the target power supply to charge the chargeable object; and
wherein determining the target power supply path between the target power supply and the chargeable object comprises:
determining, in a case that there are a plurality of chargeable objects, a target chargeable object according to a preset order of charging priority; and
determining a target power supply path between the target power supply and the target chargeable object.

2. The method according to claim 1, further comprising: controlling, in a case that the charging request does not exist, the energy storage system to supply power to the public power grid.

3. The method according to claim 1, wherein the preset priority order of power supply comprises:
a priority of the DC power supply is higher than a priority of the public power grid;
the priority of the public power grid is higher than a priority of the energy storage battery; and
the priority of the energy storage battery is higher than a priority of the chargeable vehicle, and the chargeable vehicle does not charge the energy storage battery.

4. The method according to claim 1, wherein the preset order of charging priority comprises:
in a case that the target power supply is the DC power supply, a priority of the chargeable vehicle is higher than a priority of the energy storage battery; and
in a case that the target power supply is the public power grid, the priority of the energy storage battery is lower than or equal to the priority of the chargeable vehicle.

5. The method according to claim 2, wherein controlling the energy storage system to supply power to the public power grid comprises:
obtaining operating states of candidate power supplies in the energy storage system respectively, wherein, the candidate power supplies comprise the energy storage battery, the chargeable vehicle, and a DC power supply in the energy storage system; determining a target power supply by a preset priority order of power supply according to the operating states of the candidate power supplies;
determining a target power supply path between the target power supply and the public power grid according to a path selection rule; and
controlling the target power supply path between the target power supply and the public power grid to be turned on, for the target power supply to charges the public power grid.

6. The method according to claim 1, wherein the path selection rule comprises:
the first bidirectional DC/DC circuit or the DC/DC circuit in the energy storage system is connected with at most one chargeable object at the same time.

7. The method according to claim 5, wherein the path selection rule comprises:
the first bidirectional DC/DC circuit or the DC/DC circuit in the energy storage system is connected with at most one chargeable object at the same time.

* * * * *